(12) United States Patent
    Inoue

(10) Patent No.:  US 11,954,389 B2
(45) Date of Patent:  Apr. 9, 2024

(54) PRINTING APPARATUS, CONTROL METHOD, AND STORAGE MEDIUM FOR PERFORMING PRINTING USING A CLOUD PRINT SERVICE

(71) Applicant: CANON KABUSHIKI KAISHA, Tokyo (JP)

(72) Inventor: Go Inoue, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/058,213

(22) Filed: Nov. 22, 2022

(65) Prior Publication Data

US 2023/0081685 A1    Mar. 16, 2023

Related U.S. Application Data

(63) Continuation of application No. 17/339,462, filed on Jun. 4, 2021, now Pat. No. 11,526,318.

(30) Foreign Application Priority Data

Jun. 10, 2020  (JP) ................................ 2020-101205

(51) Int. Cl.
    *G06F 3/12*    (2006.01)
(52) U.S. Cl.
    CPC .......... *G06F 3/1289* (2013.01); *G06F 3/1203* (2013.01); *G06F 3/1222* (2013.01); *G06F 3/1236* (2013.01); *G06F 3/1238* (2013.01); *G06F 3/1292* (2013.01)
(58) Field of Classification Search
    CPC .... G06F 3/1289; G06F 3/1203; G06F 3/1222; G06F 3/1236; G06F 3/1238; G06F 3/1292

USPC ........................................................ 358/1.15
See application file for complete search history.

(56) References Cited

U.S. PATENT DOCUMENTS

| 2009/0033990 | A1  | 2/2009  | Matsugashita |
|---|---|---|---|
| 2013/0235418 | A1* | 9/2013  | Tanaka .................... H04L 63/08<br>358/1.15 |
| 2014/0313539 | A1* | 10/2014 | Kawano ............. H04N 1/00339<br>358/1.14 |
| 2015/0070719 | A1* | 3/2015  | Kuribara ............... G06F 3/1292<br>358/1.15 |
| 2015/0169266 | A1* | 6/2015  | Iwasaki .................. H04N 1/001<br>358/1.14 |

(Continued)

FOREIGN PATENT DOCUMENTS

| CN | 102385490 A | 3/2012 |
|---|---|---|
| CN | 104423907 A | 3/2015 |

(Continued)

*Primary Examiner* — Allen H Nguyen
(74) *Attorney, Agent, or Firm* — Canon U.S.A., Inc. IP Division

(57) ABSTRACT

A control method of a printing apparatus for acquiring a print job from a cloud print service, and performing printing based on the acquired print job includes transmitting, in a case where a notification received from the cloud print service includes information indicating that a fetchable print job exists, a first request related to the print job, to the cloud print service, executing login processing of causing a user to log into the printing apparatus, and transmitting a second request related to the print job, to the cloud print service conditional upon the login processing being performed.

48 Claims, 15 Drawing Sheets

(56) References Cited

U.S. PATENT DOCUMENTS

| | | | |
|---|---|---|---|
| 2016/0259601 A1* | 9/2016 | Dalaa | G06F 3/1288 |
| 2017/0171399 A1* | 6/2017 | Yamada | G06F 3/1287 |
| 2023/0153044 A1* | 5/2023 | Kulkarni | G06F 3/123 |
| | | | 358/1.15 |

FOREIGN PATENT DOCUMENTS

| | | |
|---|---|---|
| CN | 107728959 A | 2/2018 |
| CN | 110908616 A | 3/2020 |
| JP | 2015018404 A | 1/2015 |
| JP | 2016175248 A | 10/2016 |
| JP | 2019202502 A | 11/2019 |
| JP | 2019209508 A | 12/2019 |

* cited by examiner

FIG.4A

- USER MANAGEMENT FUNCTION  [ON]  [OFF]
- FORCED HOLDING OF PRINT JOB  [ON]  [OFF]

[USER MANAGEMENT SETTING ▶]

↓ USER MANAGEMENT SETTING

USER MANAGEMENT

No.1  USER NAME:            Alice
      PASSWORD:             xxxxxxxx
      CLOUD ACCOUNT NAME:   alice_aa@canon.cloud.com No.2  USER NAME:            Bob
      PASSWORD:             xxxxxxxx
      CLOUD ACCOUNT NAME:   bob_bb@canon.cloud.com

[REGISTER]  [EDIT]  [RETURN]

FIG.4B

EDIT OF USER ACCOUNT

< BASIC SETTING >
  USER NAME    [Alice]
  PASSWORD     [xxxxxxxx]

< CLOUD ACCOUNT SETTING >
  CLOUD DISPLAY NAME   [Alice_aa]
  CLOUD PASSWORD       [xxxxxxxx]
  CLOUD ACCOUNT NAME   [alice_aa@canon.cloud.com]

< AUTHENTICATION SETTING >
  [IC CARD]  [MOBILE]  [BIOLOGICAL INFORMATION]

[APPLY]  [CANCEL]

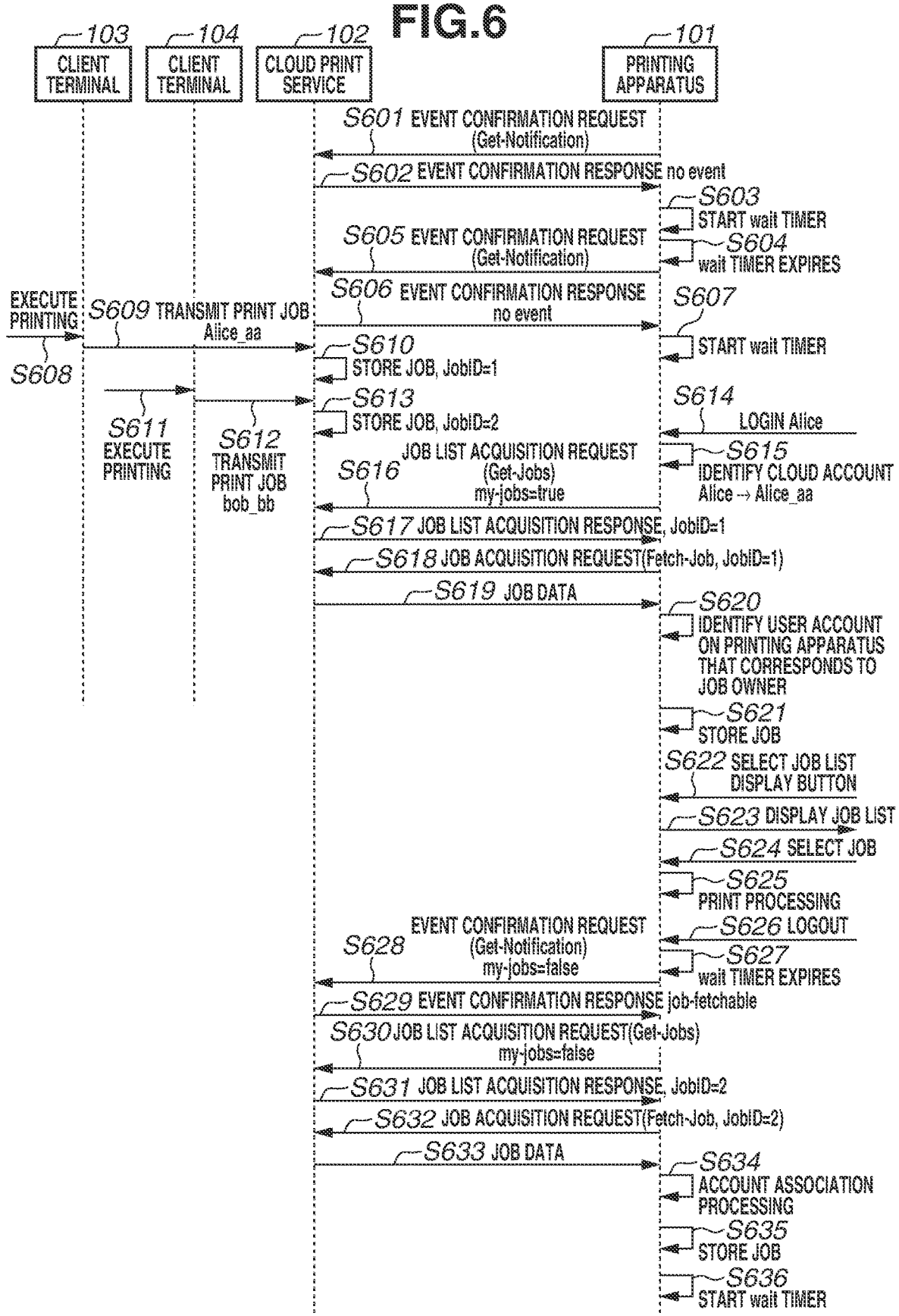

FIG.7A (A) EVENT CONFIRMATION REQUEST PACKET

Operation: Get-Notification Request
Attribute:
  notify-wait = false
  notify-sequence-numbers = 1
  notify-subscription-ids = 1
  notify-event = job-state-changed , job-fetchable

FIG.7B (B) EVENT CONFIRMATION RESPONSE PACKET
    (IN CASE WHERE PRINT JOB EXISTS)

Operation: Get-Notification Response
Status code: successful-ok
Attribute:
  notify-subscription-ids = 1
  notify-sequence-numbers = 1
  notify-subscribed-event = job-fetchable
  notify-get-interval = 300

FIG.7C (C) EVENT CONFIRMATION RESPONSE PACKET
    (IN CASE WHERE NO EVENT EXISTS)

Operation: Get-Notification Response
Status code: successful-ok
Attribute:
  notify-subscription-ids = 1
  notify-sequence-numbers = 1
  notify-get-interval = 300

FIG.8A (A) JOB LIST ACQUISITION REQUEST PACKET WHEN JOB IS DETECTED BY PERIODICAL POLLING

Operation: Get-Jobs Request
Attribute:
 which-jobs = fetchable
 my-jobs = false

FIG.8B (B) JOB LIST ACQUISITION RESPONSE PACKET WHEN JOB IS DETECTED BY PERIODICAL POLLING (IN CASE WHERE PRINT JOB EXISTS)

Operation: Get-Jobs Response
Status code: successful-ok
Attribute:
 job-id = 2

FIG.8C (C) JOB LIST ACQUISITION RESPONSE PACKET WHEN JOB IS DETECTED BY PERIODICAL POLLING (IN CASE WHERE NO PRINT JOB EXISTS)

Operation: Get-Jobs Response
Status code: successful-ok
Attribute:

FIG.9A (A) JOB LIST ACQUISITION REQUEST PACKET AT TIME
    OF LOGIN

Operation: Get-Jobs Request
Attribute:
  which-jobs = fetchable
  my-jobs = true
  requesting-user-name = Alice
  requesting-user-uri = alice@canon.cloud.com   } 901

FIG.9B (B) JOB LIST ACQUISITION RESPONSE PACKET AT TIME
    OF LOGIN (IN CASE WHERE PRINT JOB EXISTS)

Operation: Get-Jobs Response
Status code: successful-ok
Attribute:
  job-id = 1 ~902

FIG.9C (C) JOB LIST ACQUISITION RESPONSE PACKET AT TIME
    OF LOGIN (IN CASE WHERE NO PRINT JOB EXISTS)

Operation: Get-Jobs Response
Status code: successful-ok
Attribute:

FIG.10A (A) JOB ACQUISITION REQUEST PACKET

Operation: Fetch-Job Request
Attribute:
  job-id = 1

FIG.10B (B) JOB ACQUISITION RESPONSE PACKET

Operation: Get-Jobs Response
Status code: successful-ok
Attribute:
  job-id = 1
  job-uuid = urn:uuid:ce027bf-4d49-32c3-47db-054116c684fb
  job-name = test.pdf
  job-originating-user-name: Alice_aa
  job-originating-user-uri: alice@canon.cloud.com
  copies = 1
  number-up = 1
  color-mode = color

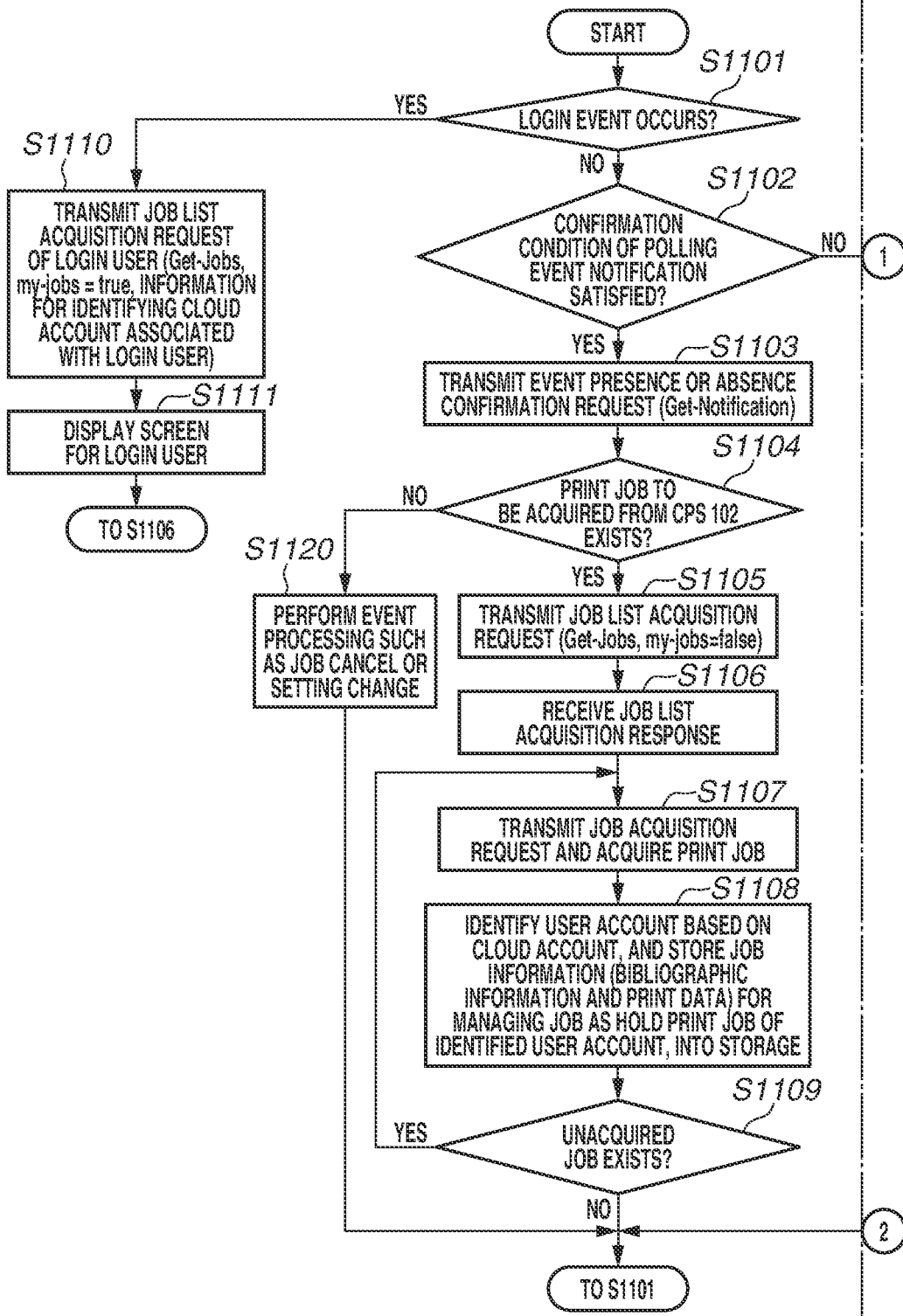

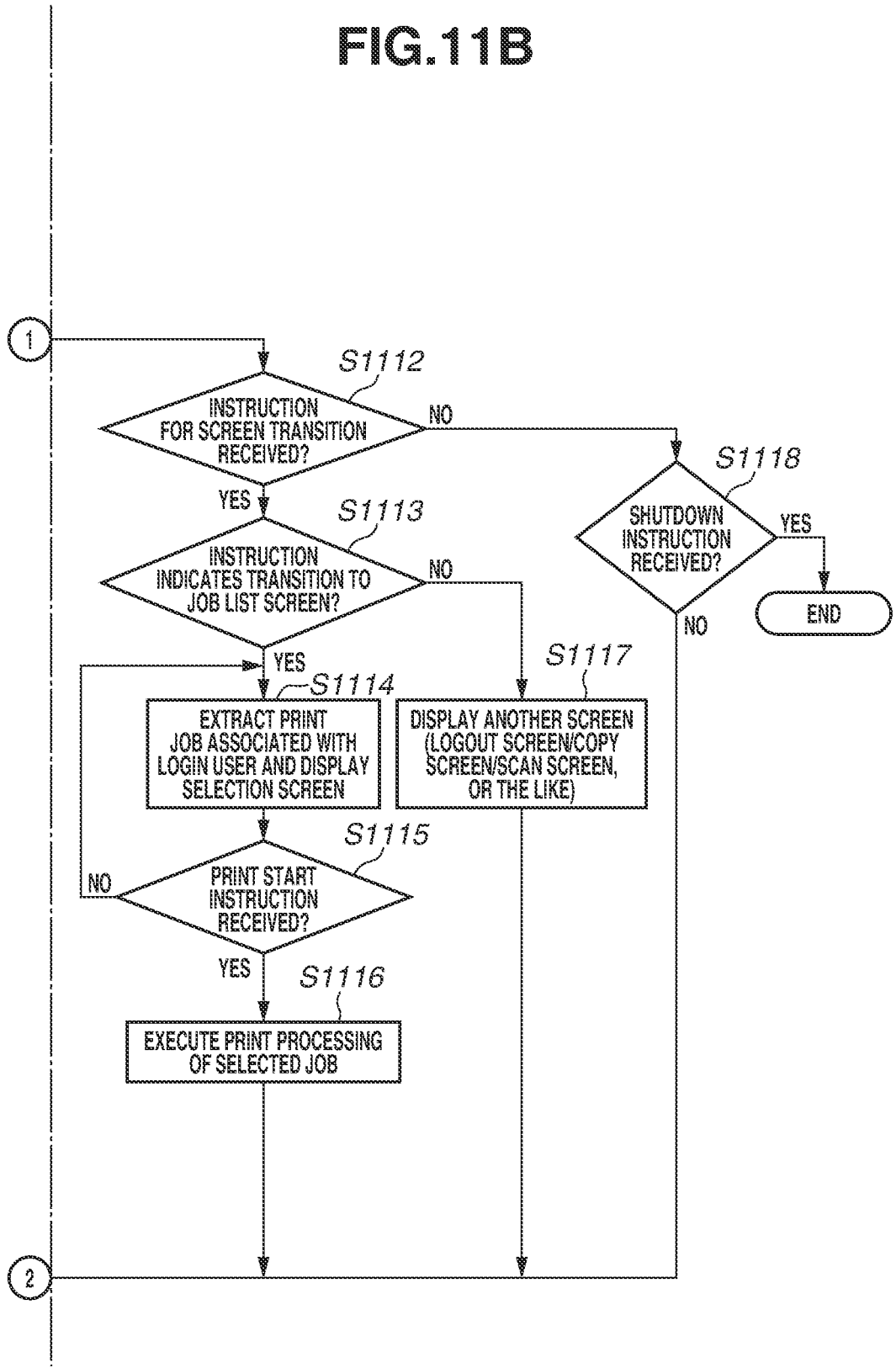

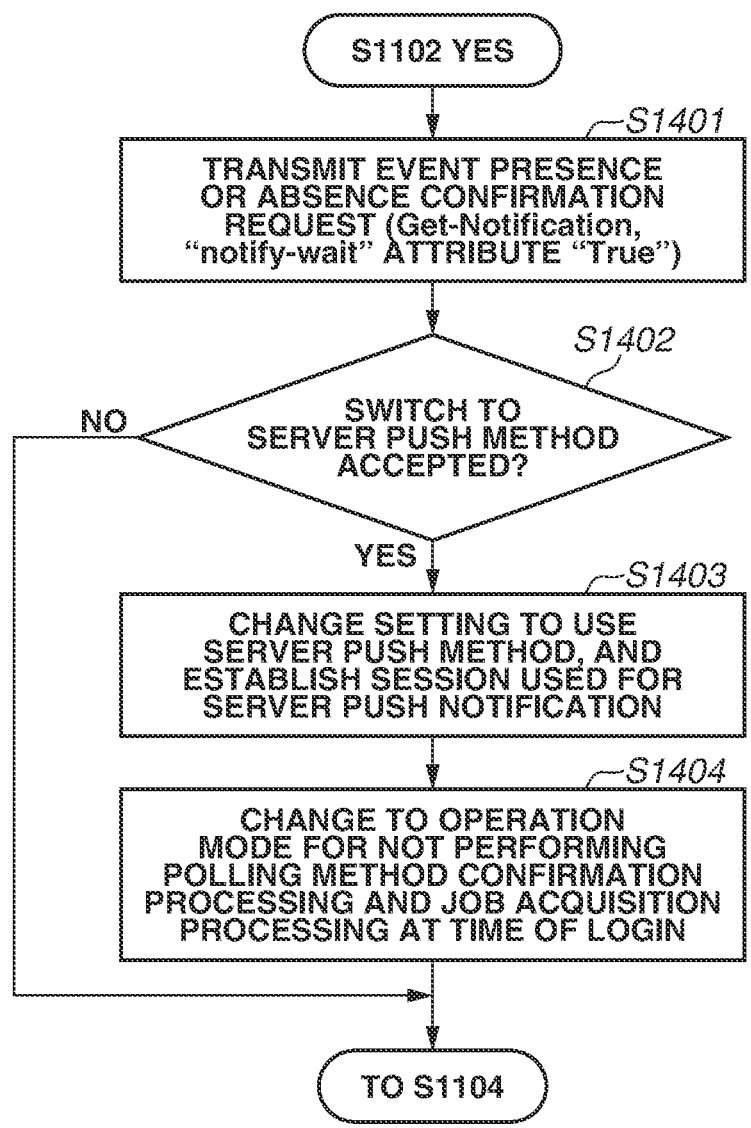

US 11,954,389 B2

PRINTING APPARATUS, CONTROL METHOD, AND STORAGE MEDIUM FOR PERFORMING PRINTING USING A CLOUD PRINT SERVICE

CROSS-REFERENCE TO RELATED APPLICATIONS

This application is a Continuation of U.S. patent application Ser. No. 17/339,462, filed Jun. 4, 2021, which claims the benefit of Japanese Patent Application No. 2020-101205, filed Jun. 10, 2020, both of which are hereby incorporated by reference herein in their entirety.

BACKGROUND

Field of the Disclosure

The present disclosure relates to a printing apparatus that receives a print job from the outside.

Description of the Related Art

In recent years, the structure of cloud print has started to prevail. In the structure of cloud print, a print job is input via a cloud and transmitted to a printing apparatus. Japanese Patent Application Laid-Open No. 2012-133489 discusses a printing system for performing cloud print. In such a printing system, an administrator first registers a printing apparatus into a cloud print service (hereinafter, will also be referred to as "CPS") to which the administrator belongs. After that, a user permitted to use the CPS selects a printing apparatus registered in the CPS, as an output printer using his/her client terminal, performs a desired print setting, and transmits a print job to the CPS. The CPS that has received the print job transfers the print job to the printing apparatus. The printing apparatus executes printing based on the transferred print job.

In a printing apparatus that is installed at an office of an organization or a company, and assumed to be used by a plurality of users, a user management function is enabled in some cases. In these cases, a user belonging to the organization or the company logs into the printing apparatus and uses each function included in the printing apparatus. A printing apparatus that performs user management in this manner sometimes utilizes a hold printing function intended for preventing a printed document from being taken away by a third person or preventing misprint. The hold printing function is a function of temporarily storing a print job received by a printing apparatus, into a storage without printing the print job upon the reception. If the hold printing function is enabled, after login of a user has succeeded, a printing apparatus prints a print job of the user.

SUMMARY

A printing apparatus including a printing unit configured to acquire a print job from a cloud print service, and perform printing based on the acquired print job includes at least one processor that executes a set of instructions, the instructions, when executed, causing the printing apparatus to perform operations including transmitting, in a case where a notification received from the cloud print service includes information indicating that a fetchable print job exists, a first request related to the print job, to the cloud print service, executing login processing of causing a user to log into the printing apparatus, and transmitting a second request related to the print job, to the cloud print service conditional upon the login processing being performed.

Further features of the present disclosure will become apparent from the following description of exemplary embodiments with reference to the attached drawings.

BRIEF DESCRIPTION OF THE DRAWINGS

FIGS. 4A and 4B illustrate an example of a screen displayed on an operation unit of a printing apparatus.

FIG. 6 illustrate an example of a transmission and reception sequence of a print job according to a first exemplary embodiment.

FIGS. 7A to 7C illustrate an example of a packet used for polling method event notification.

FIGS. 8A to 8C illustrate an example of a packet used for acquisition of job information that is triggered by polling.

FIGS. 9A to 9C illustrate an example of a packet used for acquisition of job information that is triggered by login.

FIGS. 10A and 10B illustrate an example of a transmission and reception packet related to the acquisition of a print job.

FIGS. 11A and 11B are a flowchart illustrating an example of the control of a printing apparatus.

FIG. 14 is a flowchart illustrating an example of the control of a printing apparatus according to a third exemplary embodiment.

DESCRIPTION OF THE EMBODIMENTS

Hereinafter, exemplary embodiments of the present disclosure will be described with reference to the drawings. The following exemplary embodiments are not intended to limit the appended claims, and not all the combinations of features described in the exemplary embodiments are essential to solutions of the disclosure.

The structure of cloud print is defined by PWG5100.18, RFC3995, and RFC3996. In these standards, a method of notifying an event from a cloud print service to a printing apparatus is also defined. Specifically, as one method of implementing notification, a notification method in which a printing apparatus periodically makes an inquiry of a cloud print service, and receives an event notification as a response to the inquiry is defined. Due to limitations of space, the notification method in which a printing apparatus periodically makes an inquiry of a cloud print service, and receives an event notification as a response to the inquiry will also be simply referred to as a polling method.

As an interval at which a cloud print service (CPS) and a printer perform polling, generally, an interval stipulated by a business operator that provides the CPS is often employed. The business operator that provides the CPS is expected to often set a long polling interval for the purpose of reducing load on cloud resources and maintenance and operation cost.

Depending on the interval of inquiries in the polling method, and a timing at which a user logs into a printing apparatus, before the printing apparatus recognizes that a print job of the login user exists in the CPS, login processing of the user is sometimes performed. For example, when handouts to be distributed in a conference are printed immediately before the conference, a user who desires a printed document to be output quickly sometimes logs into the printing apparatus immediately after inputting a print job from a client terminal. In this case, for example, even if the user tries to check a list of print jobs, the print job input via the CPS might fail to be displayed and the user might be bothered. In addition, irrespective of a notification method, an event notification that the CPS has tried to transmit on the printing apparatus side might fail to be received in some cases.

The exemplary embodiment to be described below provides a structure of making an inquiry of a cloud print service about a print job conditional upon the login of a user in a printing apparatus that receives a notification from the cloud print service. The exemplary embodiment also provides a structure of enhancing the convenience of printing executed via a cloud print service. Hereinafter, a specific structure will be described.

Figure 1:
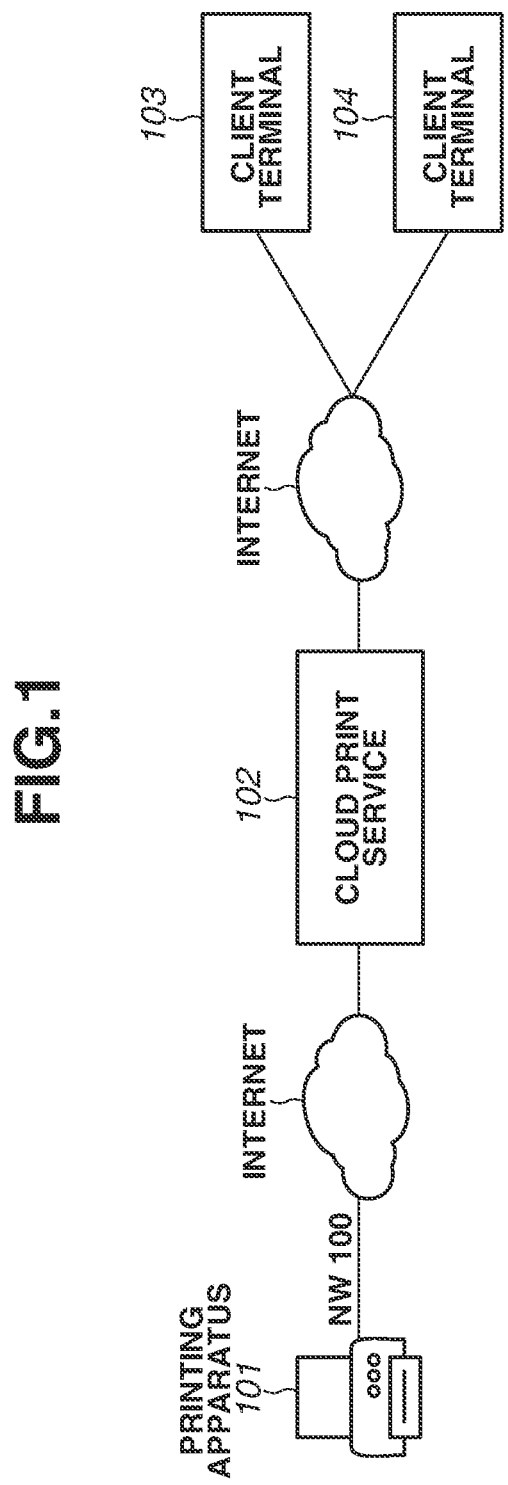
FIG. 1 is a diagram illustrating an example of a printing system.

First of all, a configuration of a printing system according to an exemplary embodiment of the present disclosure will be described with reference to FIG. 1. A printing system according to a first exemplary embodiment includes a printing apparatus 101, client terminals 103 and 104, and a cloud print service (hereinafter, will also be referred to as a CPS) 102. The printing apparatus 101 communicates with the CPS 102 on the internet via a network (NW) 100. The network 100 may include, in combination, for example, communication networks such as a local area network (LAN) and a wide area network (WAN), a cellular network (e.g., Long Term Evolution (LTE), 5G, etc.), and a wireless network complying with the IEEE802.11. In other words, the network 100 is only required to be able to transmit and receive data, and any method may be employed as a communication method of a physical layer. The client terminals 103 and 104 also communicate with the CPS 102 on the internet via a communication network and a cellular network.

The printing apparatus 101 includes a scan function of transmitting data that is based on an image read and obtained using a scanner, to the outside, a printing function of printing an image onto a sheet such as paper based on a print job received from an external device, and a copy function. In addition, the printing apparatus 101 can also receive a print job via the CPS 102 and perform printing. In the present exemplary embodiment, a multifunction peripheral (MFP) including a plurality of functions is exemplified as an example of a printing apparatus, but the printing apparatus is not limited to this. For example, a monofunctionalized single function peripheral (SFP) including only a printing function may be employed. In the present exemplary embodiment, printing onto a sheet such as paper is exemplified as an example, but printing is not limited to this. The present exemplary embodiment can also be applied to printing control in 3D print for forming a three-dimensional object based on three-dimensional shape data.

In addition, the printing apparatus 101 of the present exemplary embodiment includes a user management function. If the user management function is enabled as an operation setting of the printing apparatus 101, a user logs into the printing apparatus 101 and uses each function included in the printing apparatus 101 (details will be described below). In addition, the printing apparatus 101 includes a hold printing function intended for preventing a printed document from being taken away by a third person or preventing misprint. The hold printing function is a function of temporarily storing a print job received by a printing apparatus, into a storage without printing the print job upon the reception. If the hold printing function is enabled, after login of a user has succeeded, a printing apparatus prints a print job of the user.

The CPS 102 receives a print job from each of client terminals such as the client terminals 103 and 104, and stores the print job. Subsequently, the CPS 102 notifies the printing apparatus 101 registered in the CPS 102 that a print job has been input. The printing apparatus 101 that has received the notification acquires a print job, and temporarily stores the print job into a storage. The print job stored in the printing apparatus 101 is printed in accordance with a printing start operation being received after the user logs into the printing apparatus 101.

<Issue of Polling Method>

Figure 2:
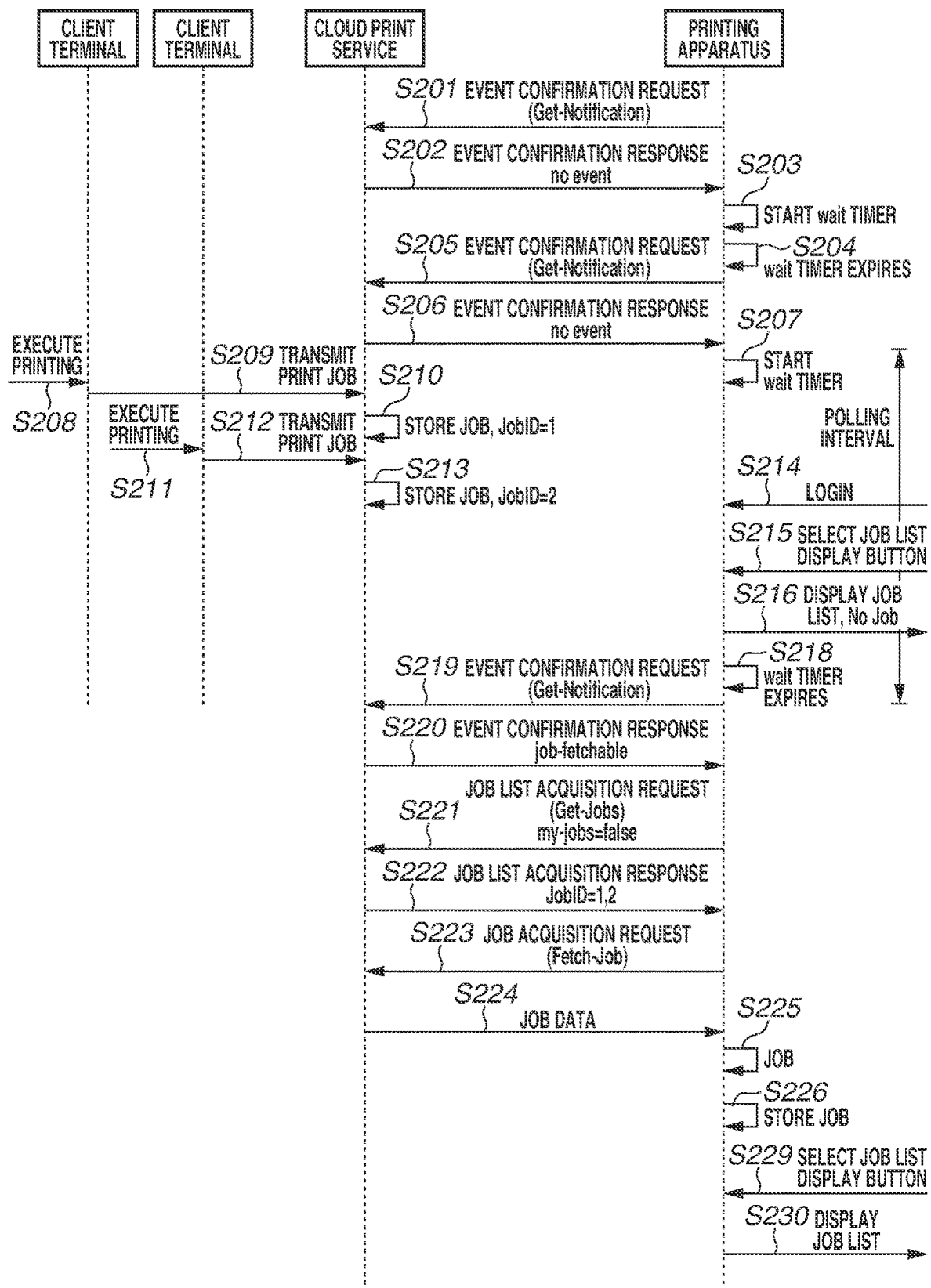
FIG. 2 illustrates an example of a sequence diagram illustrating an issue of polling method event notification.

Subsequently, transmission and reception of a job in a conventionally-known general cloud print service (CPS) will be described with reference to FIG. 2. FIG. 2 illustrates an example of a sequence of transmission and reception of a job in a general CPS. In the present exemplary embodiment, the description will be given of an example case where a polling method is employed as an event notification method from a CPS to a printing apparatus in a case where communication is performed using an internet printing protocol (IPP).

If the printing apparatus determines that a timing for performing polling with respect to the CPS comes, the printing apparatus transmits a request for confirming the presence or absence of an event notification, to the CPS, and receives an event notification as a response thereto (sequences S201 to S202). FIG. 2 exemplifies a case where no specific event to be proceeded exists. Subsequently, the printing apparatus starts timer processing for detecting that a time (e.g., 30 seconds) equivalent to a polling interval has elapsed (S203). If the printing apparatus detects that the time equivalent to the polling interval has elapsed, by the timer processing started in S203, the printing apparatus transmits a request for confirming an event notification, to the CPS (sequences S204 to S206). In this manner, if the polling method is employed, by repeating the processing described in the sequences S203 to S206, a confirmation inquiry is made each time a predetermined standby time elapses.

As a polling interval used in the polling method, generally, an interval stipulated by a business operator that provides the CPS is often employed. The business operator that provides the CPS is expected to often set a long polling interval for the purpose of reducing load on cloud resources and maintenance and operation cost.

Depending on the interval of inquiries in the polling method, and a timing at which a user logs into a printing apparatus, before the printing apparatus recognizes that a print job of the login user exists in the CPS, login processing of the user is sometimes performed.

The detailed description will be given with reference to the sequences S207 to S216. In S207, the printing apparatus starts timer processing for the next polling processing. Subsequently, the user of the client terminal selects the printing apparatus being a printer registered in the CPS, as an output printer, and issues a printing execution instruction (S208). The client terminal that has detected the execution instruction transmits a print job to the CPS, and the CPS that has received the print job stores the print job and allocates a job ID to the print job as a job managed on the CPS (sequences S209 to S210). Nevertheless, if the polling method is employed, information can be notified to the printing apparatus only in the form of a response to an event confirmation request. Thus, at this timing, the printing apparatus cannot be notified that a job has been generated. In addition, the CPS receives a print job similarly from another client terminal, and stores the print job (sequences S211 to S213).

The user who has input a job from either one client terminal tries to log into the printing apparatus for performing printing (S214). Subsequently, the printing apparatus executes login processing and causes the user to log into the printing apparatus. If the user succeeds in login, it becomes possible for the user to use each function (e.g., function of starting the printing of a held print job, copy function, or scan function) included in the printing apparatus. Subsequently, if the printing apparatus detects a user operation of selecting a button for displaying a job list of the hold printing function, the printing apparatus extracts jobs of the login user from among the held print jobs, and displays a job list (sequences S215 to S216). At this time, the printing apparatus has not recognized yet the existence of print jobs input to the CPS in the sequences S209 to S210 and S212 to S213. Thus, the user who has input the print job via the CPS is notified that no job exists. In this manner, if a relatively-long polling interval is set, even if a login user tries to check a list of print jobs, the job input via the CPS might fail to be displayed, and the login user might be bothered.

Subsequently, a sequence up to the time when it is notified that print jobs from the CPS exist and the print jobs are normally displayed will be described. If the printing apparatus detects that the time equivalent to the polling interval has elapsed, by the timer processing started in S203, the printing apparatus transmits a request for confirming an event notification, to the CPS (sequences S218 to S219). As a response to the confirmation request of an event notification that has been transmitted in S219, the CPS notifies the printing apparatus that a new fetchable print job exists (S220). Thereafter, an acquisition operation of a job list, an acquisition operation of an actual job, and storage processing of a job are sequentially performed between the CPS and the printing apparatus (sequences S221 to S226). After that, the user re-selects a button for the user who has input a print job from the client terminal via the CPS, displaying a job list again. As a result, a job list including jobs that are jobs of a login user and have been input via the CPS is displayed (sequences S229 to S230).

In this manner, if a polling interval is relatively long, a time lag is generated between the time when a print job is input and the time when the printing apparatus recognizes that the print job exists on the CPS. For example, in a case where a user who desires a printed document to be output quickly logs into the printing apparatus immediately after inputting a print job, and tries to issue a printing instruction, such as a case where handouts to be distributed in a conference are printed immediately before the conference, the input job might fail to be displayed. The user who has viewed the screen is highly likely to be bothered.

In view of at least one of these issues, the present exemplary embodiment provides a structure of making inquiry of a cloud print service about a print job conditional upon the login of a user in a printing apparatus that receives an event from the cloud print service by the polling method. The specific description will be given below.

<Hardware Configuration of Printing Apparatus 101>

Figure 3:
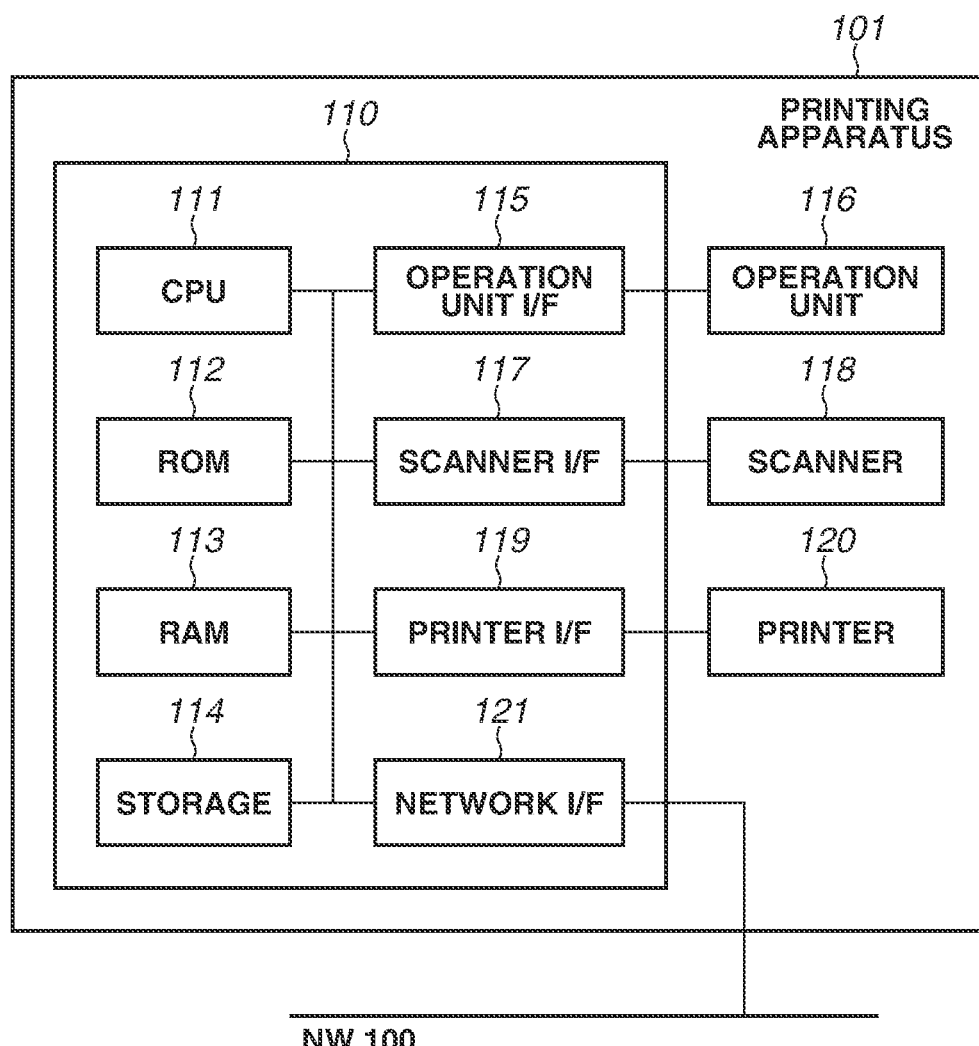
FIG. 3 is a diagram illustrating an example of a hardware configuration of a printing apparatus.

A hardware configuration of the printing apparatus 101 according to the present exemplary embodiment will be described with reference to FIG. 3. FIG. 3 is a block diagram illustrating a hardware configuration of the printing apparatus 101. The printing apparatus 101 includes a reading function of reading an image on a sheet, and a file transmission function of transmitting the read image to an external communication apparatus. The printing apparatus 101 further includes a printing function of printing an image onto a sheet. The printing apparatus 101 further includes a function of receiving a print job from the CPS 102 and printing the received print job, the above-described user management function, and the above-described hold printing function.

A control unit 110 including a central processing unit (CPU) 111 controls the operation of the entire printing apparatus 101. The CPU 111 reads control programs stored in a read only memory (ROM) 112 or a storage 114, and performs various types of control such as printing control and reading control. The ROM 112 stores control programs executable by the CPU 111. A random access memory (RAM) 113 is a main storage memory to be accessed by the CPU 111, and is used as a work area or a temporary storage region for loading various control programs. The storage 114 stores print jobs, image data, various programs, and various types of setting information. In this manner, hardware components such as the CPU 111, the ROM 112, the RAM 113, and the storage 114 constitute a so-called computer.

In the printing apparatus 101 of the present exemplary embodiment, one CPU 111 executes each piece of processing illustrated in a flowchart to be described below, using one memory (the RAM 113), but another configuration may be employed. For example, a plurality of processors, memories, and storages may cooperatively execute each piece of processing illustrated in the flowchart to be described below. In addition, a part of the processing may be executed using a hardware circuit.

A printer interface (I/F) 119 connects a printer 120 (printer engine) and the control unit 110. The printing apparatus 101 generates a print image and a printing control command that are to be transferred to the printer 120, based on a print job. Based on the print image and the printing control command that have been input via the printer OF 119, the printer 120 prints an image onto a sheet fed from a sheet feeding cassette (not illustrated). The printing method may be an electrophotographic method of transferring and fixing toner onto paper, or may be an inkjet method of performing printing by injecting ink onto paper.

A scanner I/F 117 connects a scanner 118 and the control unit 110. The scanner 118 reads a document placed on a platen (not illustrated), and then generates image data. The image data generated by the scanner 118 is printed by the printer 120, stored into the storage 114, and transmitted to an external device via a network I/F 121.

An operation unit I/F 115 connects an operation unit 116 and the control unit 110. The operation unit 116 includes a liquid crystal display unit having a touch panel function, and various hardware keys. The operation unit 116 functions as a display unit that displays information to the user, and a reception unit that receives an instruction from the user. The CPU 111 performs display control of information and reception control of user operations in cooperation with the operation unit 116.

A network cable is connected to the network I/F 121, and communication can be executed with an external device on the network 100 or on the internet. In the present exemplary embodiment, the network I/F 121 is assumed to be a communication interface that performs wired communication complying with the Ethernet®, but the network I/F 121 is not limited to this. For example, the network I/F 121 may be a wireless communication interface complying with the IEEE802.11 series. Alternatively, both may be wireless communication interfaces. Alternatively, the network I/F 121 may be a communication interface that performs cellular communication such as the 3G line including code division multiple access (CDMA), the 4G line including LTE, and 5G NR.

Figure 5:
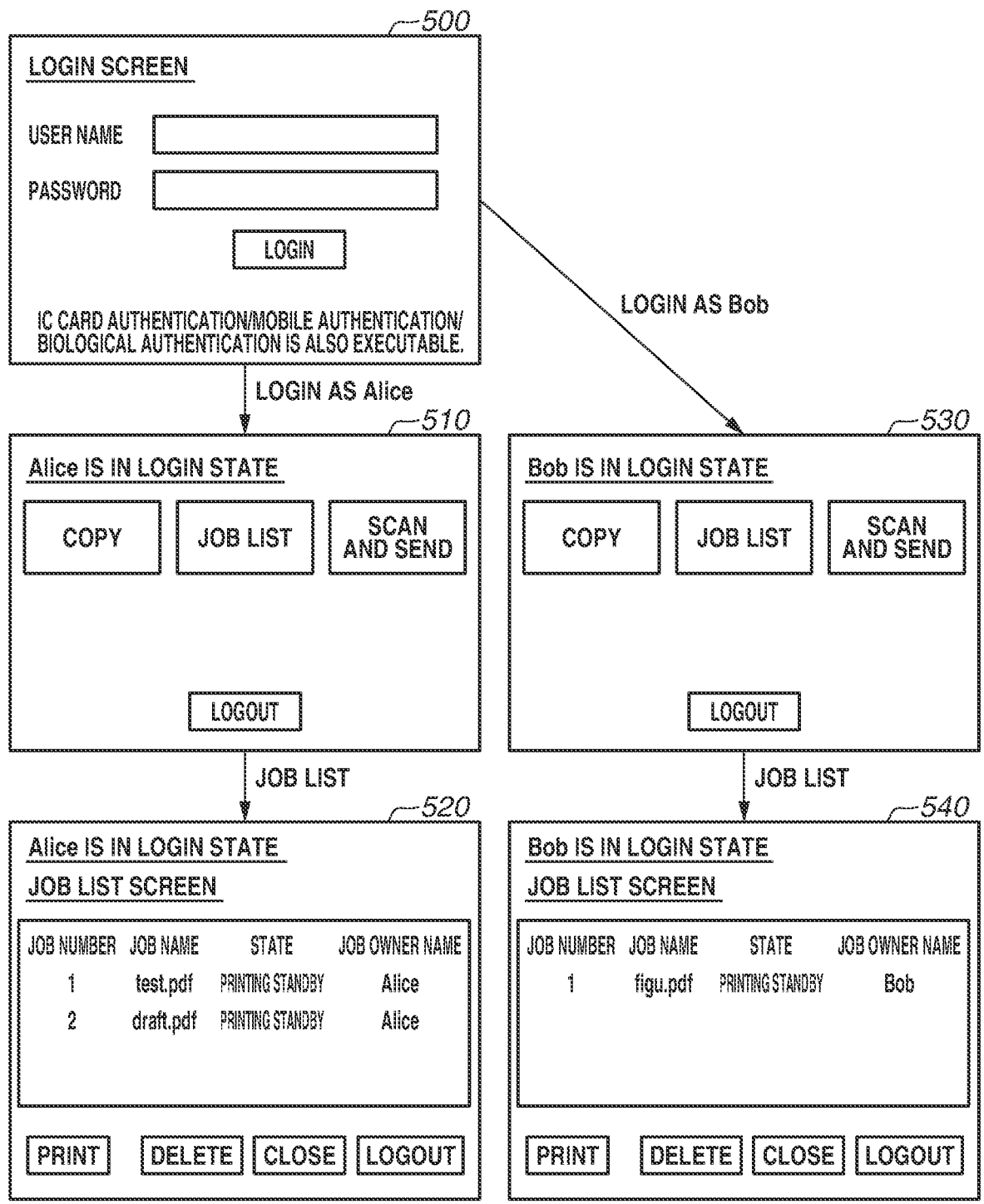
FIG. 5 illustrates an example of operation screens for describing user login control in a user management function and a forced hold printing function.

Subsequently, an operation setting of a printing apparatus will be described with reference to FIGS. 4A, 4B, and 5. FIGS. 4A and 4B illustrate an example of a setting screen to be displayed on the operation unit 116 of the printing apparatus 101. In addition, FIG. 5 illustrates an example of operation screens for describing user login control in a user management function and a forced hold printing function. First of all, a setting screen illustrated in FIG. 4A will be described. FIG. 4A illustrates an example of a management screen of the printing apparatus 101, and illustrates a screen to be provided to a user having an administrator authority. FIG. 4A exemplifies a case where the user management function is enabled and the forced hold function of a print job is enabled. The settings made via the screens illustrated in FIGS. 4A and 4B are stored into the storage 114, and appropriately referred to when various types of control of the printing apparatus are performed. A user management setting key is a key used for registering a user account of a user to be managed using the user management function, and editing a user account.

If the CPU 111 of the printing apparatus 101 detects that the user management setting key has been selected, the CPU 111 switches a screen to be displayed on the operation unit 116, to a user management screen. FIGS. 4A and 4B exemplify an example case where user accounts of "Alice" and "Bob" are registered in the printing apparatus 101.

In the present exemplary embodiment, a case where the printing apparatus 101 manages a database for managing user accounts is exemplified, but user account management is not limited to this. The management of user accounts of users using the printing apparatus 101 can also be implemented in cooperation with an external authentication server. For example, user accounts may be managed in cooperation with an Active Directory service or an Azure® Active Directory service provided by Microsoft®.

The description will return to FIGS. 4A and 4B. A registration key is a key used for registering a new user. An edit key is a key used for editing a selected user account. If the CPU 111 of the printing apparatus 101 detects that the edit key has been pressed, the CPU 111 switches a screen to be displayed on the operation unit 116, to an edit screen illustrated in FIG. 4B. The user can change a user name and a password via the edit screen. The user can also associate the user account and a cloud account to be used by the user on the CPS 102. A "cloud account name" is an item for setting an account name registered in the CPS 102. While a user name managed in a printing apparatus and an account name managed by the CPS 102 match each other in some cases, the user name and the account name do not match each other in other cases. If the user name and the account name do not match each other, a cloud account on the CPS 102 and a user account of the printing apparatus 101 can be linked by preliminarily registering the association.

In addition, the user can also register other user credentials used for login, via the edit screen illustrated in FIG. 4B. An IC card key is a key used for associating an IC card such as an employee ID card, a student identification card, or a license with a user account. In addition, a mobile is a key used for setting whether to use login that uses a mobile application. A biological information key is a key used for associating biological information such as face information or fingerprint information with a user account.

Subsequently, a method of printing a held print job temporarily stored in the storage 114, using the user management function and the forced hold function will be described with reference to FIG. 5. A screen 500 exemplifies a screen in a logout state in which no user logs in to the printing apparatus 101. The screen 500 serves as both a lock screen displayed in a state in which no user logs in to the printing apparatus 101, and a screen for inputting a user credential. While the lock screen is displayed, the printing apparatus 101 performs control not to display screens of the copy function and the scan function on the operation unit 116.

A user who desires to log into the printing apparatus 101 inputs a user credential including a user ID and a password, via the screen 500. If the printing apparatus 101 detects that a login key has been pressed after the user credential has been input, the printing apparatus 101 performs user authentication processing. Specifically, the printing apparatus 101 determines whether a user account corresponding to the input user credential is registered in the printing apparatus 101. If the user account is registered, the printing apparatus 101 determines that user authentication has succeeded, and executes login processing. If the user account is not registered, the printing apparatus 101 determines that user authentication has failed, and displays an error message (not illustrated). If a card ID or biological information is associated with a user account, a card ID read from an IC card, or biological information obtained from a camera or a fingerprint authentication sensor can also be used as a user credential.

Subsequently, the printing apparatus 101 executes login processing of causing a user to log into the printing apparatus 101, and displays an operation screen for the user. A screen 510 exemplifies a case where Alice described with reference to FIGS. 4A and 4B has logged into the printing apparatus 101, and a screen 530 exemplifies a case where Bob has logged into the printing apparatus 101. FIG. 5 exemplifies a case where a menu screen for selecting each function provided by the printing apparatus 101 is displayed.

A COPY key is a key used for displaying a screen of a copy function of printing a scan image obtained by reading a document using the scanner 118, onto a sheet. A scan and send key is a key used for displaying a screen of a transmission function of transmitting a scan image obtained by reading a document using the scanner 118, to an external device. A job list key is a key used for displaying a selection screen for selecting a print target from among print jobs temporarily held in the storage 114 by the forced hold printing function.

If the printing apparatus 101 detects that the job list key has been selected, the printing apparatus 101 switches a screen to be displayed on the operation unit 116, to a job list screen. A screen 520 exemplifies a job list screen to be displayed when a login user is Alice, and a screen 540 exemplifies a job list screen to be displayed when a login user is Bob.

Print jobs input by Alice are displayed on the screen 520. On the other hand, a print job input by Bob is displayed on the screen 540. A login user can select a print job to be printed, via the job list screen. If the printing apparatus 101 detects that a print key has been selected after one or more print jobs have been selected, the printing apparatus 101 executes printing processing based on the selected print jobs to be printed. A delete key is a key used for deleting a selected print job, and a close key is a key used for closing the job list screen of the hold printing function, and returning to a main menu screen. In the present exemplary embodiment, a case where a print job input from the CPS 102 is displayed on the job list screen is exemplified, but a print job to be displayed on the job list screen is not limited to this. For example, a print job directly received from a printer driver installed on a personal computer (PC) can also be displayed on the job list screen. For example, a print job that has been input from a PC of Alice using a printer driver, and has Alice as a job owner may also be displayed on the screen 520.

<Transmission and Reception Sequence of Print Job in First Exemplary Embodiment>

Subsequently, an acquisition sequence of a print job in the present exemplary embodiment will be described with reference to FIG. 6. The description of the control similar to that in a general sequence described with reference to FIG. 2 will be appropriately omitted.

First of all, if the CPU 111 of the printing apparatus 101 determines that a timing for performing polling with respect to the CPS 102 comes, the CPU 111 transmits a request for confirming the presence or absence of an event notification, to the CPS 102 (S601). The event notification is a notification transmitted from the CPS 102 to the printing apparatus 101, and indicates the notification of the occurrence of an event and the content of the event, such as a notification indicating that a print job fetchable by the printing apparatus 101 exists, or a notification indicating that a status of a print job has changed.

FIGS. 7A, 7B, and 7C are diagrams each illustrating an example of a packet used for issuing an event notification, and FIG. 7A illustrate an example of the request transmitted in S601. As a request for confirmation that is to be transmitted in S601, for example, an operation defined by an IPP that is called "Get-Notification" can be used. A "notify-event" attribute indicates the type of an event desired to be detected. In the present exemplary embodiment, FIG. 7A exemplifies a case where "job-state-changed" and "job-fetchable" are designated as the types of events desired to be detected.

The "job-state-changed" indicates that an event desired to be detected is an event indicating that a state change has occurred in a print job managed by the CPS 102. The printing apparatus 101 detects that a job state has changed to a cancelled state when the print job is cancelled in the CPS102, by using the above event notification mechanism. In addition, the "job-fetchable" indicates that an event desired to be detected is an event indicating that a print job has been input to the CPS 102 and a print job fetchable by the printing apparatus 101 has been stored.

A "notify-wait" attribute is an attribute value indicating whether a desired method of an event notification is a polling method (will also be referred to as a pull method) or a server push method. If "False" is designated as the "notify-wait" attribute, the polling method (pull method) is desired. If "True" is designated as the "notify-wait" attribute, the server push method is desired. In the present exemplary embodiment, because the polling method is assumed to be used, FIG. 7A exemplifies a case where "False" is designated.

The description will return to FIG. 6. If no event to be notified to the printing apparatus 101 occurs, the CPS 102 transmits a response indicating that no event exists. The printing apparatus 101 receives the response (S602). FIG. 7C exemplifies a response packet of no event.

A value of "notify-get-interval" designated in the response indicates an interval time (polling interval) until the next transmission of a Get-Notification request. For example, if "300" is designated as in the response illustrated in FIG. 7C, the printing apparatus 101 sets 300 seconds as a standby time for waiting until the next transmission of a confirmation request. FIG. 7B illustrates an example of a response to be transmitted in a case where an event has occurred, and illustrates an example of an event notification indicating that a print job fetchable by the printing apparatus 101 has been stored. The printing apparatus 101 that has received the event exemplified in FIG. 7B tries to acquire a print job from the CPS 102. The acquisition control of a print job that is based on an event notification will be described in detail with reference to the flowchart to be described below.

The description will return to FIG. 6. Because the polling processing that uses the timer function in the sequences S603 to S607 is similar to that in the sequences S203 to S207 of FIG. 2, the description will be omitted.

Next, the description will be given of the control performed in a case where job input and user login occur after the printing apparatus 101 shifts in S607 to a state for waiting until the next transmission of a confirmation request, and within the standby period. The client terminal 103 that has detected the execution instruction transmits a print job to the CPS 102 (sequences S608 to S609). In the present exemplary embodiment, the description will be given assuming that a print job having "alice_aa@canon.cloud.com" indicating a job owner is transmitted to the CPS 102. The CPS 102 that has received the print job from the client terminal 103 stores the print job, and allocates a job ID as a print job managed on the CPS 102 (S610). In addition, another client terminal 104 that has detected the execution instruction transmits a print job to the CPS 102, and the CPS 102 stores the print job onto the CPS 102 (sequences S611 to S613). In the present exemplary embodiment, the description will be given assuming that a print job having "bob_bb@canon.cloud.com" indicating a job owner is stored onto the CPS 102. In the CPS 102, a job owner of a print job is managed using a cloud account name.

Subsequently, the user who has input a print job to the CPS 102 from the client terminal logs into the printing apparatus 101 for executing printing (S614). FIG. 6 exemplifies a case where Alice has logged into the printing apparatus 101.

Subsequently, the printing apparatus 101 identifies a cloud account associated with a user account of the login user (S615). The printing apparatus 101 searches a user DB for a cloud account name associated with the login user account "Alice". For example, if the user accounts and the cloud accounts described with reference to FIGS. 4A and 4B are registered, a cloud account "alice_aa@canon.cloud.com" is identified based on the user account "Alice".

Subsequently, the printing apparatus 101 transmits a print job list acquisition request including information for identifying a cloud account, to the CPS 102 (S616). As the print job list acquisition request, a "Get-Jobs" operation defined by the IPP can be used. FIGS. 9A, 9B, and 9C illustrate an example of an acquisition request for requesting a list of jobs of a specific user, and a response thereto. FIG. 9A exemplifies an acquisition request for a print job that has "alice_aa@canon.cloud.com" indicating a job owner, and is fetchable by the printing apparatus 101. The printing apparatus 101 designates "fetchable" as a "which-jobs" attribute in this request. The designation of an attribute value means that a list of print jobs in a fetchable state is requested. The printing apparatus 101 also designates a combination of attributes indicated in an area 901, in this request. Specifically, the printing apparatus 101 designates "True" as a "my-jobs" attribute. Furthermore, the printing apparatus 101 designates attribute values for uniquely identifying a user using a "Requesting-user-name" attribute and a "Requesting-user-uri" attribute. In the present exemplary embodiment, the printing apparatus 101 designates "Alice" being a user account name of the user who has logged into the printing apparatus 101, as an attribute value of "Requesting-user-name. In addition, the printing apparatus 101 designates "alice_aa@canon.cloud.com" being a cloud account name identified in S615, as an attribute value of "Requesting-user-uri". In the present exemplary embodiment, the request includes two attributes "Requesting-user-name" and "Requesting-user-uri", but attributes are not limited to these. It is sufficient that one piece of attribute information that can uniquely identify a user on the CPS 102 is included.

The description will return to FIG. 6. The CPS 102 that has received the request transmitted in S616 extracts a print job satisfying a requirement, from among print jobs stored in the storage of the CPS 102. In the present exemplary embodiment, the CPS 102 makes a determination by comparing a cloud account name of a print job that is managed by the CPS 102, and an attribute value included in the "Requesting-user-uri" attribute. Specifically, the CPS 102 extracts a print job that has a job owner name matching "alice_aa@canon.cloud.com", and is in a fetchable state, a response target. The description will now be given assuming that a print job with job ID1 that has been input by "alice_aa@canon.cloud.com" is extracted. The job owner may be identified using a user name managed on the cloud service and "Requesting-user-name".

If the extraction is completed, the CPS 102 transmits a response indicating a list of extracted print jobs, as a response to the request transmitted in S616 (S617). FIG. 9B exemplifies a response indicating a list of print jobs that is obtained as a response to the request exemplified in FIG. 9A. In the response, a job ID required for acquisition processing of a print job is listed. In the present exemplary embodiment, as indicated in an area 902, only a job ID of a print job in a printing standby state that has been input by Alice is extracted. If a job satisfying a requirement does not exists, the CPS 102 transmits a response exemplified in FIG. 9C.

Subsequently, the printing apparatus 101 transmits a job acquisition request to the CPS 102 (S618). FIGS. 10A and 10B illustrate an example of a request and a response that are related to job acquisition, and FIG. 10A illustrates an example of a request related to job acquisition. As exemplified in FIG. 10A, the printing apparatus 101 transmits a "Fetch-job" request operation designating a job ID for identifying a print job desired to be acquired, in the request, to the CPS 102. The CPS 102 that has received the request transmits job data corresponding to the job ID, to the printing apparatus 101. The printing apparatus 101 receives job data (S619). FIG. 10B illustrates an example of job data received in S619. In the job data, attribute information (will also be referred to as print setting) of a print job, such as a job name, the number of copies, a color setting, and information for uniquely identifying a job owner on the CPS 102 is stored. FIG. 10B exemplifies a case where "alice_aa@canon.cloud.com" being a cloud account name is stored as information for identifying a job owner of the job Job1. FIG. 10B exemplifies a case where "alice_aa" being a cloud display name is stored as information for identifying a job owner.

The printing apparatus 101 identifies a user account on the printing apparatus 101 based on the cloud account name (S620). The printing apparatus 101 searches the user DB for a user account associated with a cloud account corresponding to the information for identifying a job owner that is included in the job data. For example, by searching the user DB using "alice_aa@canon.cloud.com" being information for identifying a job owner, a user account "Alice" is identified.

Subsequently, the printing apparatus 101 stores a print job (job information and actual print data) owned by the user identified in S620 based on the job data received in S619, into the storage 114 (S621). If the forced hold function of a print job is disabled, printing processing of the acquired job data is performed in place of the processing in S621.

By performing the above-described processing in the sequences S615 to S621 that is triggered by user login, it becomes possible to appropriately detect a user job input to the CPS 102 during a standby time of the next transmission of a confirmation request.

Lastly, if the printing apparatus 101 detects that an operation for displaying a job list has been performed by the user who has logged into the printing apparatus 101, the printing apparatus 101 displays a job list of the forced hold function (S622 to S623). In the job list, a print job input by a login user is displayed as described with reference to FIG. 5.

If the printing apparatus 101 detects a user operation of starting printing after a user operation of selecting a print target from the job list has been performed, the printing apparatus 101 executes printing processing of one or more print jobs selected as a print target (S624 to S625). If the printing is completed, the user who has accomplished a purpose performs a logout operation. The printing apparatus 101 that has detected the logout operation executes logout processing of causing the user to log out from the printing apparatus 101, and switches a screen to be displayed on the operation unit 116, to the logout screen 500 (S626).

Lastly, job acquisition on the CPS 102 by periodical polling will be described. If the printing apparatus 101 determines that the time equivalent to the standby time has elapsed, by the timer function started in S607, the printing apparatus 101 transmits a request for confirming the presence or absence of an event notification, to the CPS 102 (sequences S627 to S628). Because a job with a job ID2 that has been input by Bob exists, the CPS 102 that has received the request transmits a response including an event indicating "job-fetchable" that is exemplified in FIG. 7B, to the printing apparatus 101 (S629).

The printing apparatus 101 that has received the response transmitted in S629 transmits a print job list acquisition request. FIGS. 8A, 8B, and 8C illustrate an example of an acquisition request and a response that are to be transmitted when an event indicating that a print job fetchable by the printing apparatus 101 is generated is received as an event notification by periodical polling. As illustrated in FIG. 8A, the printing apparatus 101 designates "fetchable" as a "which-jobs" attribute and designates "False" as a "my-jobs" attribute in the acquisition request. By designating "False" as a "my-jobs" attribute, the printing apparatus 101 can try to acquire all print jobs fetchable by the printing apparatus 101. The CPS 102 that has received the request transmitted in S630 extracts print jobs fetchable by the printing apparatus 101, and transmits a response including the result (S631). FIG. 8B illustrates an example of a response transmitted in S631. If a print job fetchable by the printing apparatus 101 does not exist, the CPS 102 transmits a response exemplified in FIG. 8C.

Because the processing from acquisition processing to storage processing of job data that is based on a job ID in the sequences S632 to S635 is performed in a similar way to the sequences S618 to S621, the description will be omitted. If the acquisition and storing of job data are completed, the printing apparatus 101 starts a timer function based on an interval time (polling interval) included in the response transmitted in S629 (S636).

The control of the printing apparatus 101 will be described with reference to a flowchart illustrated in FIGS. 11A and 11B. Each operation (step) illustrated in the flowchart in FIGS. 11A and 11B is implemented by the CPU 111 executing a control program stored in the ROM 112 or the storage 114. The processing illustrated in FIGS. 11A and 11B is repeatedly executed after the power of the printing apparatus 101 is turned on and the printing apparatus 101 normally starts up.

In step S1101, the CPU 111 determines whether a login event has occurred. Specifically, the CPU 111 tries to perform user authentication based on a user credential acquired in a state in which the screen 500 is displayed. If the CPU 111 determines that the user is caused to perform login, as a result of the user authentication (YES in step S1101), the processing proceeds to step S1110. If user authentication has failed, or if user authentication is not requested (NO in step S1101), the processing proceeds to step S1102.

In step S1102, the CPU 111 determines whether a confirmation condition of polling event notification is satisfied. If the CPU 111 determines that a confirmation condition of polling event notification is satisfied (YES in step S1102), the processing proceeds to step S1103. If the CPU 111 determines that a confirmation condition of polling event notification is not satisfied (NO in step S1102), the processing proceeds to step S1112. The determination can be implemented using timer interrupt by the above-described timer function.

In step S1103, the CPU 111 transmits a confirmation request for confirming the presence or absence of an event notification, to the CPS 102. For example, the CPU 111 transmits the request exemplified in FIG. 7A, to the CPS 102.

In step S1104, the CPU 111 determines whether a print job to be acquired from the CPS 102 exists, based on the response received from the CPS 102. Specifically, if the transmitted response is a response including "job-fetchable" that is exemplified in FIG. 7B, the processing proceeds to step S1105. On the other hand, if the transmitted response is a response not including "job-fetchable", the processing proceeds to step S1120.

In step S1120, the CPU 111 performs processing such as cancel of a print job or a change of a job setting in accordance with the content of the response (event notification). If the processing is completed, the processing proceeds to step S1101. If the CPU 111 is notified of a response (event notification) indicating no event, the CPU 111 advances the processing to step S1101 without specifically performing processing.

On the other hand, in step S1105, the CPU 111 transmits the print job list acquisition request exemplified in FIG. 8A. As described above, the request is a request for trying to acquire a list of all print jobs fetchable by the printing apparatus 101 without identifying a job owner.

In step S1106, the CPU 111 receives a response indicating a list of print jobs fetchable by the printing apparatus 101, from the CPS 102. The response includes a job ID for identifying a print job fetchable by the printing apparatus 101, as exemplified in FIG. 8B.

In step S1107, the CPU 111 transmits a job acquisition request designating a job ID, to the CPS 102. Subsequently, the CPU 111 acquires a print job as a response to the request. Specifically, the CPU 111 transmits a fetch-job operation and acquires a job-template attribute. The attribute includes the print settings exemplified in FIG. 10B, and information for identifying a cloud account. Subsequently, the CPU 111 transmits an acknowledge-job request. The request is a request for notifying the CPS 102 that a job has been accepted. Upon receiving a response to the request, the CPU 111 transmits a fetch-document request to the CPS 102. The request is a request for print data (page-description language (PDL) data). The CPU 111 receives print data (PDL data) from the CPS 102 as a response to the fetch-document request. In the present exemplary embodiment, a combination of print data and attributes indicating the print settings illustrated in FIG. 10B will be referred to as a print job. In the present exemplary embodiment, an acquisition method of a print job that is defined by the PWG5100.18 is exemplified, but an acquisition method is not limited to this.

In step S1108, the CPU 111 identifies a user account in the printing apparatus 101 based on information for identifying a cloud account that has been acquired in step S1107. Subsequently, the CPU 111 stores job information for managing a job as a held print job of the identified user account, into the storage 114. The job information is information including a correspondence relationship between bibliographic information such as a print setting and a job owner name, and print data (PDL data). The bibliographic information is also used for displaying the above-described job list.

In step S1109, the CPU 111 determines whether an unacquired print job exits. Specifically, if there is a job ID which is included in the response received in step S1106, and for which the print job described in steps S1107 to S1108 has not been acquired, the CPU 111 determines that an unacquired print job exits. If the CPU 111 determines that an unacquired print job exits (YES in step S1109), the CPU 111 designates a job ID for which the acquisition has not been performed, and executes job acquisition processing and storage processing of job information and print data in steps S1107 to S1108. On the other hand, if the CPU 111 determines that jobs with all the job IDs included in the response received in step S1106 have been acquired (NO in step S1109), the processing proceeds to step S1101.

Subsequently, the control performed in a case where a login event has occurred will be described. In step S1110, the CPU 111 transmits a request for acquiring a job list of a login user, to the CPS 102. In the request, "True" is designated as a my-job attribute as described above. In addition, the request includes information for identifying a cloud account associated with the login user. FIG. 9A illustrates an example of a request for acquiring a job list of a login user. Subsequently, in step S1111, the CPU 111 displays an operation screen for the user who has succeeded in login, on the operation unit 116. If the switch to the operation screen is completed, the processing proceeds to step S1106. The subsequent acquisition sequence of a print job that is based on a job ID is similar to an acquisition sequence of acquiring a job ID being triggered by an event notification.

On the other hand, in step S1112, the CPU 111 determines whether a screen transition instruction has been received. If a screen transition instruction has been received (YES in step S1112), the processing proceeds to step S1113. If a screen transition instruction has not been received (NO in step S1112), the processing proceeds to step S1118.

In step S1113, the CPU 111 determines whether the screen transition instruction indicates a transition to a job list screen. If the screen transition instruction indicates a transition to a job list screen (YES in step S1113), the processing proceeds to step S1114. If the screen transition instruction does not indicate a transition to a job list screen (NO in step S1113), the processing proceeds to step S1117. In step S1117, the CPU 111 displays another screen corresponding to the instruction, on the operation unit 116. For example, if a logout instruction has been issued, the CPU 111 displays the screen 500. Alternatively, if a transition instruction to a copy screen has been issued, the CPU 111 displays the copy screen (not illustrated) on the operation unit 116. If a transition instruction to a scan screen has been issued, the CPU 111 displays the scan screen (not illustrated) on the operation unit 116.

In step S1114, the CPU 111 extracts a print job associated with a user who has logged into the printing apparatus 101, based on job information (bibliographic information) stored in the storage 114. Subsequently, the CPU 111 displays a selection screen (job list) on which the extracted print job is selectable. A job list exemplified in the screen 520 or 540 in FIG. 5 is an example of the selection screen.

In step S1115, the CPU 111 determines whether a printing start instruction has been received. If a printing start instruction has been received (YES in step S1115), the processing proceeds to step S1116. If a printing start instruction has not been received (NO in step S1115), the processing returns to step S1114. In step S1114, the CPU 111 waits for a selection operation performed via the screen.

In step S1116, the CPU 111 executes printing processing of the print job selected as a print target, in cooperation with the printer 120. Specifically, the CPU 111 generates a print image and a control command for controlling a printer, based on print data and a print setting identified based on job information managed in the storage 114. Subsequently, the CPU 111 transmits the control command and the print image to the printer 120. The printer 120 selects an appropriate sheet (paper) from a sheet feeding unit based on the control command, conveys the sheet to a conveyance path (not illustrated), and prints the print image onto the sheet moving on the conveyance path. The sheet (printed document) on which printing has been completed is discharged to a discharge tray (not illustrated). If the printing processing based on the selected print job is completed, the CPU 111 advances the processing to step S1101.

Lastly, in step S1118, the CPU 111 determines whether a shutdown instruction has been received. If a shutdown instruction has been received (YES in step S1118), the CPU 111 performs shutdown processing for turning off the power, and ends a series of processes. On the other hand, if a shutdown instruction has not been received (NO in step S1118), the processing proceeds to step S1101 for waiting for a further operation or the occurrence of an event.

By the above-described series of processes, in a printing apparatus, it becomes possible to make an inquiry about a job conditional upon the login of the user, in addition to an inquiry by polling. Thus, when the user logs into the printing apparatus, it becomes possible to appropriately detect the presence or absence of a print job on the CPS 102.

In a second exemplary embodiment, the description will be given of a structure of performing exceptional control when a cloud account cannot be identified from a user account, in addition to the processing of the first exemplary embodiment. A hardware configuration of each apparatus in the second exemplary embodiment is similar to that in the first exemplary embodiment. Hereinafter, a difference from the first exemplary embodiment will be described.

Figure 12:
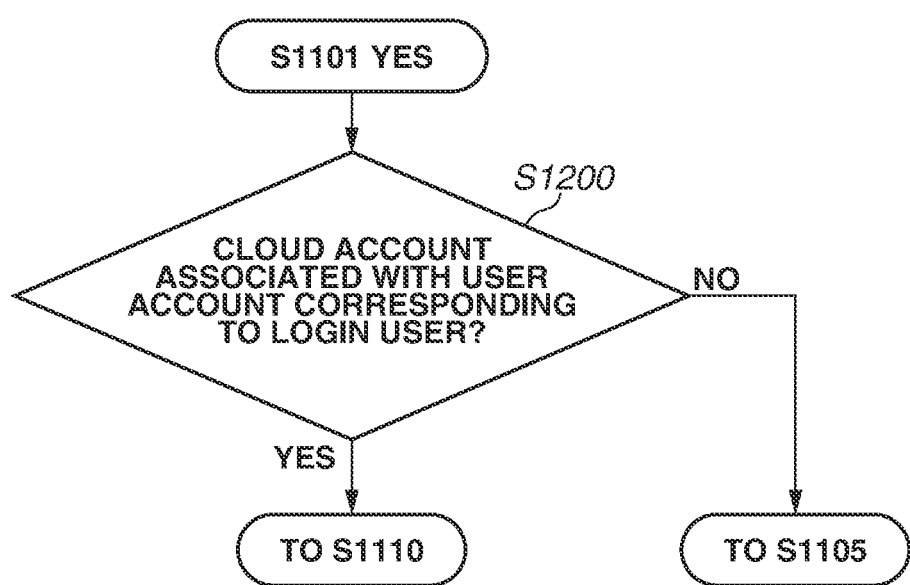
FIG. 12 is a flowchart illustrating an example of the control of a printing apparatus according to a second exemplary embodiment.

FIG. 12 illustrates an example of a flowchart for describing exceptional processing to be added to the first exemplary embodiment. Each operation (step) illustrated in the flowchart in FIG. 12 is implemented by the CPU 111 executing a control program stored in the ROM 112 or the storage 114. In the second exemplary embodiment, if it is determined in step S1101 of the first exemplary embodiment that a login event has occurred, the CPU 111 performs the determination processing in step S1200 exemplified in FIG. 12. Specifically, in step S1200, the CPU 111 determines whether a cloud account is associated with a user account corresponding to a login user. If the CPU 111 determines that a cloud account is associated with a user account corresponding to a login user (YES in step S1200), the processing proceeds to the job acquisition processing of the login user that is exemplified in step S1110. On the other hand, if the CPU 111 determines that a cloud account is not associated with a user account corresponding to a login user (NO in step S1200), the processing proceeds to processing of acquiring all jobs that has been described in step S1105.

Figure 13:
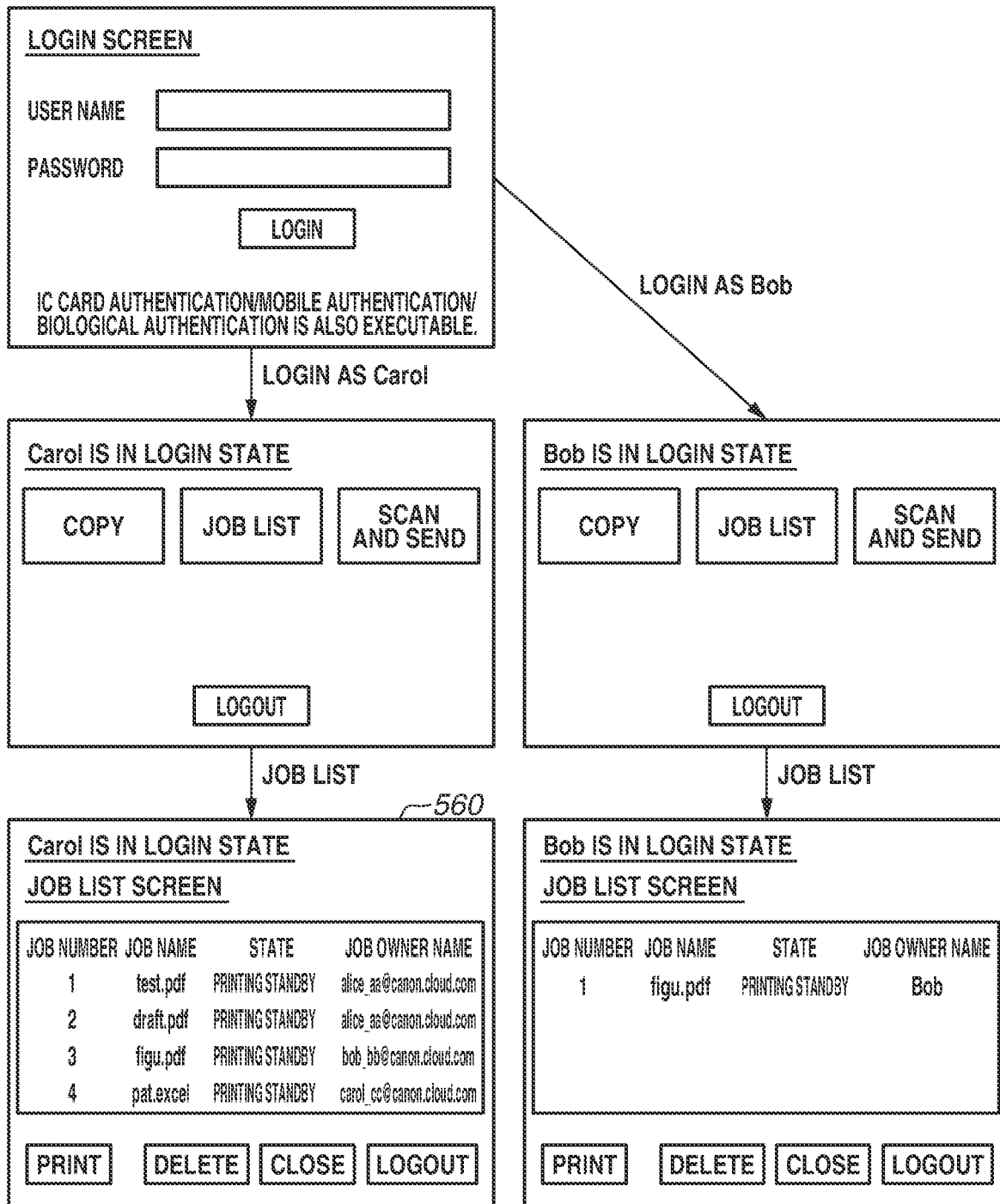
FIG. 13 illustrates an example of a screen displayed on an operation unit of a printing apparatus according to the second exemplary embodiment.

FIG. 13 is a diagram illustrating an example of a display method of a selection screen (job list) in the second exemplary embodiment. The description will be given of an example case where a user account of Carol is registered in addition to those of Alice and Bob in the first exemplary embodiment. In this example, Carol has a user account for the printing apparatus 101, but a cloud account is not associated with the user account. In the present exemplary embodiment, if Carol whose user account is not associated with a cloud account logs into the printing apparatus 101 and displays a job list, control is performed in such a manner that all print jobs received via the CPS 102 are displayed. On the other hand, if a user such as Bob whose user account is associated with a cloud account logs into the printing apparatus 101 and displays a job list, control is performed in such a manner that a job list extracting only a print job of Bob is displayed similarly to the first exemplary embodiment.

By the processing, even if a user whose user account is not associated with a cloud account inputs a job from the CPS 102, all fetchable print jobs can be acquired from the CPS 102 in a case of being triggered by login. In addition, it becomes possible to appropriately present a job list including the acquired print jobs, to the user.

In the first and second exemplary embodiments, a case has been exemplified where the polling method is employed for implementing event notification between the CPS 102 and the printing apparatus 101. On the other hand, if the server push method is used as described above, an issue attributed to a polling interval is unlikely to occur.

In a third exemplary embodiment, the description will be given of a structure of performing control of switching a notification method if the server push method becomes available, by the function update of the cloud print service or the printing apparatus 101, in addition to the control in the first and second exemplary embodiments. A hardware configuration of each apparatus in the third exemplary embodiment is similar to that in the first exemplary embodiment. Hereinafter, a difference from the first exemplary embodiment will be described.

FIG. 14 illustrates an example of a flowchart for describing exceptional processing to be added to the first exemplary embodiment. Each operation (step) illustrated in the flowchart in FIG. 14 is implemented by the CPU 111 executing a control program stored in the ROM 112 or the storage 114. In the third exemplary embodiment, if it is determined in step S1102 of the first exemplary embodiment that the confirmation condition is satisfied, alternative processing in FIG. 14 is performed in place of the processing in step S1103 of the first exemplary embodiment.

Specifically, in step S1401, the CPU 111 transmits an event presence or absence confirmation request in which "True" is designated as a "notify-wait" attribute. In this manner, in the third exemplary embodiment, by designating "True" as the "notify-wait" attribute, the intention to desire server push notification is indicated. Subsequently, in step S1402, the CPU 111 determines whether switch to server push has been accepted in the CPS 102, based on the response (event notification) received from the CPS 102. If the CPU 111 determines that switch to server push has been accepted (YES in step S1402), the processing proceeds to step S1403. If the CPU 111 determines that switch to server push has not been accepted (NO in step S1402), the processing proceeds to step S1104.

In step S1403, the CPU 111 changes an operation setting of the cloud print service to use a server push. Subsequently, the CPU 111 establishes a network session used for server push notification. For example, the CPU 111 establishes a chat session of an extensible messaging and presence protocol (XMPP) or the like between the printing apparatus 101 and the CPS 102. An event notification can be received via the established chat session. The method of implementing server push is an example, and the method is not limited to this. If a change to the server push method is completed, the CPU 111 advances the processing to step S1404.

In step S1404, the CPU 111 changes an operation setting of the printing apparatus to an operation mode for not performing polling method confirmation processing and job acquisition processing at the time of login. If the change is completed, the processing proceeds to step S1104. By the processing in step S1404, by the switch to the server push method, it is possible to avoid performing polling confirmation request processing and job acquisition request processing at the time of login.

Modified Example

In the above-described exemplary embodiment, a case has been exemplified where a print job held using the forced hold function is printed after being selected via a job list. Nevertheless, a printing structure is not limited to this. Specifically, the present disclosure includes a case where, after login processing is executed, a held print job corresponding to the login user is automatically printed. In this case, a setting for selecting whether to perform automatic printing after login is provided in a setting of each user account that is exemplified in FIG. 4B. When a login event occurs, the CPU 111 refers to a user account of a user who has logged in. Then, if a setting for performing automatic printing after login is not selected for the user account of the user who has logged in, the CPU 111 performs processing similar to the above-described exemplary embodiment. On the other hand, a setting for performing automatic printing after login is selected for the user account of the user who has logged in, the CPU 111 performs automatic printing processing in placed of the storage processing in step S1108. Specifically, in cooperation with the printer 120, the CPU 111 executes printing processing of automatically printing a print job stored in association with the login user, and a print job corresponding to the login user that has been newly acquired from the CPS 102.

By the structure described in each of the above-described exemplary embodiments, in a printing apparatus, it becomes possible to make an inquiry about a job conditional upon the login of the user, in addition to a notification from a server. Thus, when the user logs into the printing apparatus, it becomes possible to appropriately detect the presence or absence of a print job on a cloud print service. In addition, by the structure described in each of the above-described exemplary embodiments, it becomes possible to enhance the convenience of printing executed via a cloud print service.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:
1. A printing apparatus for acquiring a print job from a cloud print service, and performing printing of the acquired print job, the printing apparatus comprising:
a storage configured to store a cloud account and a user account in association with each other; and
one or more processors that execute a set of instructions, the instructions, when executed, causing the printing apparatus to perform operations comprising:
transmitting, in a case where a notification received from the cloud print service includes information indicating that a fetchable print job exists, a first request related to the fetchable print job, to the cloud print service;
performing a process that enables a user of the stored user account to log into the printing apparatus;
transmitting a second request related to a print job of the stored cloud account associated with the stored user account of the user who has logged into the printing apparatus, to the cloud print service; and
performing printing of the print job of the stored cloud account of the cloud print service.

2. The printing apparatus according to claim 1,
wherein the operations further comprise performing printing of a print job transmitted from the cloud print service in response to the first request, and
wherein the second request is a request related to a print job of the stored cloud account associated with the stored user account of the user who has logged into the printing apparatus.

3. The printing apparatus according to claim 2, wherein, in a case where a cloud account corresponding to a user account of a user who has logged into the printing apparatus is not associated with the stored user account of the user who has logged into the printing apparatus as the correspondence relationship, the first request related to the print job is transmitted to the cloud print service conditional upon the user having logged into the printing apparatus.

4. The printing apparatus according to claim 2, wherein the operations further comprise performing control to perform printing of a print job managed in association with the stored user account of the user who has logged into the printing apparatus, in accordance with the user having logged into the printing apparatus.

5. The printing apparatus according to claim 4, wherein the operations further comprise performing control to perform, in a case where a new print job has been acquired based on the second request, and in accordance with the user having logged into the printing apparatus, printing of the print job which is newly acquired and corresponds to the stored user account of the user who has logged into the printing apparatus.

6. The printing apparatus according to claim 5, wherein the printing of the print job corresponding to the stored user account of the user who has logged into the printing apparatus is performed without receiving a selection operation of a print job that is performed by a user.

7. The printing apparatus according to claim 2, wherein, in the printing apparatus, job information is managed based on information obtained via the first request and the second request,
the operations further comprising:
displaying, in a case where a predetermined instruction has been received after the user has logged into the printing apparatus, a selection screen on which a print job managed in association with the stored user account of the user who has logged into the printing apparatus is selectable as a print target, based on the job information.

8. The printing apparatus according to claim 7, the operations further comprising:
receiving print data corresponding to a print job managed in the cloud print service using the obtained information; and
storing the received print data into the storage,
wherein, in the printing apparatus, the job information required for execution of the print job, and the print data stored in the storage are managed in association with each other.

9. The printing apparatus according to claim 1, the operations further comprising transmitting a third request for confirming presence or absence of an event notification, to the cloud print service at a predetermined interval,
wherein the event notification is received from the cloud print service as a response to the third request, and
wherein, in a case where a setting to use a server push technique as a method for receiving an event notification from the cloud print service is made, the third request is not transmitted.

10. The printing apparatus according to claim 9, wherein, in a case where the setting to use the server push technique is made and in a case where the user has logged into the printing apparatus, the second request is not transmitted.

11. The printing apparatus according to claim 1, wherein the first request is a request for acquiring the print job.

12. The printing apparatus according to claim 1, wherein a specific function of the printing apparatus becomes available upon a user logging into the printing apparatus.

13. The printing apparatus according to claim 1, wherein the notification and the print job are received by the printing apparatus.

14. The printing apparatus according to claim 1,
wherein the second request related to the print job is transmitted to the cloud print service conditional upon the login processing being executed.

15. The printing apparatus according to claim 1,
wherein the second request is a request related to the print job selected from a job list by the user.

16. The printing apparatus according to claim 1,
wherein the print job of which the printing is performed is a print job received in accordance with the transmission of the second request.

17. A method performed by a printing apparatus configured to acquire a print job from a cloud print service, and perform printing of the acquired print job, the printing apparatus comprising a storage configured to store a cloud account and a user account in association with each other, the method comprising:
transmitting, in a case where a notification received from the cloud print service includes information indicating that a fetchable print job exists, a first request related to the fetchable print job, to the cloud print service;
performing a process that enables a user of the stored user account to log into the printing apparatus;
transmitting a second request related to a print job of the stored cloud account associated with the stored user account of the user who has logged into the printing apparatus, to the cloud print service; and
performing printing of the print job of the stored cloud account of the cloud print service.

18. The method according to claim 17,
further comprising performing printing of a print job transmitted from the cloud print service in response to the first request, and
wherein the second request is a request related to a print job of the stored cloud account associated with the stored user account of the user who has logged into the printing apparatus.

19. The method according to claim 18, wherein, in a case where a cloud account corresponding to a user account of a user who has logged into the printing apparatus is not associated with the stored user account of the user who has logged into the printing apparatus as the correspondence relationship, the first request related to the print job is transmitted to the cloud print service conditional upon the user having logged into the printing apparatus.

20. The method according to claim 18, further comprising performing control to perform printing of a print job managed in association with the stored user account of the user who has logged into the printing apparatus, in accordance with the user having logged into the printing apparatus.

21. The method according to claim 20, further comprising performing control to perform, in a case where a new print job has been acquired based on the second request, and in accordance with the user having logged into the printing apparatus, printing of the print job which is newly acquired and corresponds to the stored user account of the user who has logged into the printing apparatus.

22. The method according to claim 21, wherein the printing of the print job corresponding to the stored user account of the user who has logged into the printing apparatus is performed without receiving a selection operation of a print job that is performed by a user.

23. The method according to claim 18, wherein, in the printing apparatus, job information is managed based on information obtained via the first request and the second request,
the method further comprising:
displaying, in a case where a predetermined instruction has been received after the user has logged into the printing apparatus, a selection screen on which a print job managed in association with the stored user account of the user who has logged into the printing apparatus is selectable as a print target, based on the job information.

24. The method according to claim 23, further comprising:
receiving print data corresponding to a print job managed in the cloud print service using the obtained information; and
storing the received print data into the storage,
wherein, in the printing apparatus, the job information required for execution of the print job, and the print data stored in the storage are managed in association with each other.

25. The method according to claim 17, further comprising transmitting a third request for confirming presence or absence of an event notification, to the cloud print service at a predetermined interval,
wherein the event notification is received from the cloud print service as a response to the third request, and
wherein, in a case where a setting to use a server push technique as a method for receiving an event notification from the cloud print service is made, the third request is not transmitted.

26. The method according to claim 25, wherein, in a case where the setting to use the server push technique is made and in a case where the user has logged into the printing apparatus, the second request is not transmitted.

27. The method according to claim 17, wherein the first request is a request for acquiring the print job.

28. The method according to claim 17, wherein a specific function of the printing apparatus becomes available upon a user logging into the printing apparatus.

29. The method according to claim 17, wherein the notification and the print job are received by the printing apparatus.

30. The method according to claim 17,
wherein the second request related to the print job is transmitted to the cloud print service conditional upon the login processing being executed.

31. The method according to claim 17,
wherein the second request is a request related to the print job selected from a job list by the user.

32. The method according to claim 17,
wherein the print job of which the printing is performed is a print job received in accordance with the transmission of the second request.

33. A non-transitory computer-readable storage medium storing a computer-executable program for causing a printing apparatus to execute a method, the printing apparatus being configured to acquire a print job from a cloud print service and perform printing of the acquired print job, the printing apparatus comprising a storage configured to store a cloud account and a user account in association with each other, the method comprising:
transmitting, in a case where a notification received from the cloud print service includes information indicating that a fetchable print job exists, a first request related to the fetchable print job, to the cloud print service;
performing a process that enables a user of the stored user account to log into the printing apparatus;
transmitting a second request related to a print job of the stored cloud account associated with the stored user account of the user who has logged into the printing apparatus, to the cloud print service; and
performing printing of the print job of the stored cloud account of the cloud print service.

34. The non-transitory computer-readable storage medium according to claim 12,
wherein the method further comprises performing printing of a print job transmitted from the cloud print service in response to the first request, and
wherein the second request is a request related to a print job of the stored cloud account associated with the stored user account of the user who has logged into the printing apparatus.

35. The non-transitory computer-readable storage medium according to claim 34, wherein, in a case where a cloud account corresponding to a user account of a user who has logged into the printing apparatus is not associated with the stored user account of the user who has logged into the printing apparatus as the correspondence relationship, the first request related to the print job is transmitted to the cloud print service conditional upon the user having logged into the printing apparatus.

36. The non-transitory computer-readable storage medium according to claim 34, wherein the method further comprises performing control to perform printing of a print job managed in association with the stored user account of the user who has logged into the printing apparatus, in accordance with the user having logged into the printing apparatus.

37. The non-transitory computer-readable storage medium according to claim 36, wherein the method further comprises performing control to perform, in a case where a new print job has been acquired based on the second request, and in accordance with the user having logged into the printing apparatus, printing of the print job which is newly acquired and corresponds to the stored user account of the user who has logged into the printing apparatus.

38. The non-transitory computer-readable storage medium according to claim 37, wherein the printing of the print job corresponding to the stored user account of the user who has logged into the printing apparatus is performed without receiving a selection operation of a print job that is performed by a user.

39. The non-transitory computer-readable storage medium according to claim 34, wherein, in the printing apparatus, job information is managed based on information obtained via the first request and the second request,
the method further comprising:
displaying, in a case where a predetermined instruction has been received after the user has logged into the printing apparatus, a selection screen on which a print job managed in association with the stored user account of the user who has logged into the printing apparatus is selectable as a print target, based on the job information.

40. The non-transitory computer-readable storage medium according to claim 39, the method further comprising:
- receiving print data corresponding to a print job managed in the cloud print service using the obtained information; and
- storing the received print data into the storage,
- wherein, in the printing apparatus, the job information required for execution of the print job, and the print data stored in the storage are managed in association with each other.

41. The non-transitory computer-readable storage medium according to claim 33, the method further comprising transmitting a third request for confirming presence or absence of an event notification, to the cloud print service at a predetermined interval,
- wherein the event notification is received from the cloud print service as a response to the third request, and
- wherein, in a case where a setting to use a server push technique as a method for receiving an event notification from the cloud print service is made, the third request is not transmitted.

42. The non-transitory computer-readable storage medium according to claim 41, wherein, in a case where the setting to use the server push technique is made and in a case where the user has logged into the printing apparatus, the second request is not transmitted.

43. The non-transitory computer-readable storage medium according to claim 33, wherein the first request is a request for acquiring the print job.

44. The non-transitory computer-readable storage medium according to claim 33, wherein a specific function of the printing apparatus becomes available upon a user logging into the printing apparatus.

45. The non-transitory computer-readable storage medium according to claim 33, wherein the notification and the print job are received by the printing apparatus.

46. The non-transitory computer-readable storage medium according to claim 33,
- wherein the second request related to the print job is transmitted to the cloud print service conditional upon the login processing being executed.

47. The non-transitory computer-readable storage medium according to claim 33,
- wherein the second request is a request related to the print job selected from a job list by the user.

48. The non-transitory computer-readable storage medium according to claim 33,
- wherein the print job of which the printing is performed is a print job received in accordance with the transmission of the second request.

\* \* \* \* \*